United States Patent [19]

Scanlon et al.

[11] Patent Number: 5,352,529
[45] Date of Patent: Oct. 4, 1994

[54] LIGHTWEIGHT THRUST VECTORING PANEL

[75] Inventors: John F. Scanlon, Bath; Gary Wigell, Lansing, both of Mich.

[73] Assignee: Auto-Air Composites, Inc., Lansing, Mich.

[21] Appl. No.: 25,918

[22] Filed: Mar. 3, 1993

Related U.S. Application Data

[63] Continuation-in-part of Ser. No. 699,316, May 13, 1991, abandoned.

[51] Int. Cl.$^5$ .................. B32B 9/00; B32B 17/00; B64C 1/00
[52] U.S. Cl. ..................... 428/428; 428/34.7; 428/58; 428/246; 428/446; 501/11; 65/17.3; 423/337; 423/338; 244/117 R
[58] Field of Search ............... 428/428, 34.7, 58, 246, 428/446; 501/11; 65/18.1; 423/331, 338; 244/117 R, 114 B, 129.1

[56] References Cited

U.S. PATENT DOCUMENTS 4,888,376 12/1989 Atwell et al. .................. 524/401

OTHER PUBLICATIONS

Allied Signal, Blackglas Technology, pp. 1-8, date unknown.

Primary Examiner—Patrick J. Ryan
Assistant Examiner—R. Weisberger
Attorney, Agent, or Firm—Knechtel, Demeur & Samlan

[57] ABSTRACT

A thrust vectoring panel which is a hybrid ceramic/ceramic composite consisting of three layers of lightweight materials, the anisotropic properties of which are manipulated such that the properties of the materials, i.e., the coefficient of thermal expansion, the strain energy release rate, and the tensile and flexure modules, either match or gradually transition from material to material. The three layers include a face layer which is of a high temperature capable material that can withstand temperatures within a range of 2300°-25000° F. for an extended period of time and a temperature as high as 28000° F. for a short period of time. The middle layer simply is an insulating layer for providing adequate thermal insulation for the activator mechanism for the thrust panel. The third layer is a skeletal structure or layer which is of a lightweight material having sufficient strength to support all the integral interfaces, such as the activator mounts and the like.

13 Claims, 1 Drawing Sheet

LIGHTWEIGHT THRUST VECTORING PANEL

This is a continuation-in-part of copending application Ser. No. 07/699,316 filed on May 13, 1991, now abandoned.

BACKGROUND OF THE INVENTION

This invention relates to a new and improved lightweight thrust vectoring panel.

Thrust vectoring panels are used to deflect the thrust of axial turbine engines when activated by an electromechanical or hydraulic force. Typically, they are fabricated of a beta titanium alloy nickel based super alloy or similar metal. Another type uses a non-structural ceramic or carbon heat shield on a metal structure which is capable of being activated to deflect the thrust of the engine. Existing thrust vectoring panels all suffer from one or more problems including but not limited to excessive weight, short service life, and inadequate thermal insulation to protect the activator mechanism. Accordingly, the industry still is seeking an improved thrust vectoring panel to overcome these deficiencies of these existing panels.

OBJECT OF THE INVENTION

Accordingly, it is an object of the invention to provide a new and improved thrust vectoring panel which is lightweight, has a much longer service life, and provides adequate thermal insulation to protect the activator mechanism.

SUMMARY OF THE INVENTION

The above objectives as well as others not specifically mentioned are accomplished by providing a thrust vectoring panel which is a hybrid ceramic, ceramic composite consisting of three layers of lightweight materials the anisotropic properties of which are manipulated such that the properties of time materials, i.e., the coefficient of thermal expansion, the strain energy release rate, and the tensile and flexure modules, either match or gradually transition from material to material. The three layers include a face layer which is of a high temperature capable material that can withstand temperatures within a range of 2300°-2500° F. for an extended period of time and a temperature as high as 2800° F. for a short period of time. During these temperature excursions at least 90% of the room temperature strength of the panel is retained. An example of a material which can be used for the face layer is a silicon carboxide matrix with ceramic reinforcing fibers, such as nicalon fibers manufactured by Dow Corning. Silicon carboxide (SiCxCy), tradename Blackglas, by Allied-Signal, is a refractory silica-based glass containing 15-30% atomically distributed carbon. Silicon carboxide is made from polymer precursors through a polymerization/pyrolyzation process which can generally be described as follows:

1. A liquid oligimer solution is infiltrated into a suitable reinforcing fiber such as nicalon.
2. The oligimer is polymerized in an autoclave at 350° F. and 100 psi pressure.
3. The rigid polymer is pyrolized at 1500° F. in an inert nitrogen atmosphere. The pyrolysis converts the polymer precursor to silicon carboxide.
4. To increase the density of the silicon carboxide matrix, further reinfiltration of polymer solution and pyrolisis cycles may be conducted. The layer simply is an insulating layer for providing adequate thermal insulation for the activator mechanism and substructure for the thrust panel. The insulating layer can be, for example, a fiber reinforced polymer. The third layer is a skeletal structure or layer which is of a lightweight material having sufficient strength to support all the integral interfaces, such as time activator mounts and the like. The skeletal structure can be, for example, a fiber reinforced high temperature polymer, such as carbon fiber polyamide.

DETAIL DESCRIPTION OF THE INVENTION

Figure 1:
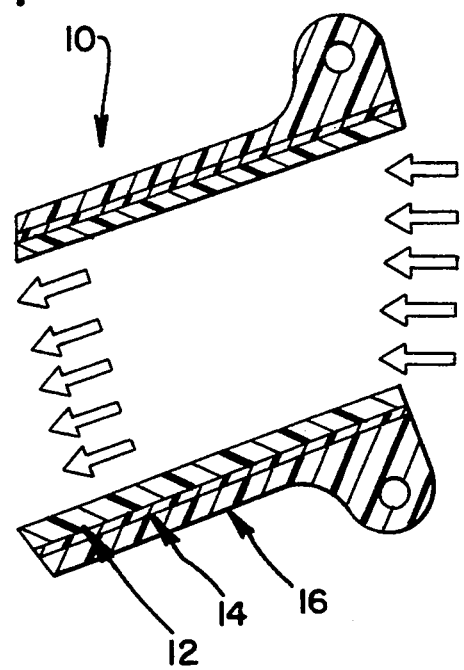
FIG. 1 is a section view of a thrust vector panel exemplary of the invention.

Referring now to the drawings, in FIG. 1 there is generally illustrated a thrust vectoring panel or nozzle 10 exemplary of the invention. The thrust vectoring panel 10 is a hybrid ceramic-ceramic composite structure consisting of a high temperature face layer 12, an insulation layer 14 and a backbone or skeletal structure 16.

The high temperature face layer 12 is of a lightweight ceramic material that is capable of withstanding high temperatures within a range of 2200°-2500° F. for an extended period of at least 2000 hours and a temperature as high as 2800° F. for a short period of at least 5 to 10 minutes the temperatures are commonly encountered in deflecting jet engine thrust. During these temperature excursions at least 90% of the room temperature strength of the panel is retained. The ceramic material preferably is a silicon carboxide matrix with ceramic reinforcing fibers, such as nicalon fibers manufactured by Dow Corning because of its lightweight and more importantly, its ease of fabrication and application in forming the thrust vectoring panel 10. The face layer 12 also can be a ceramic material having the same or similar high temperature capable characteristics.

One suitable ceramic material of which the face layer 12 can be made is a ceramic manufactured by Allied Signal and sold under the trademark Blackglas. Blackglas ceramic is formed from polymer precursors. These offer the ease of fabrication of polymer matrix composites and the high temperature capability of ceramic materials.

Blackglas ceramic is silicon carboxide ($Si\ C_x\ O_y$), a highly refractory, silicon-based glass containing 15-30% atomically distributed carbon. Silicon carboxide is made from polymer precursors through a polymerization/pyrolyzation process which can generally be described as follows:

1. A liquid oligimer solution is coated or infiltrated into a suitable reinforcing fiber such as Nicalon fiber made by Nippon Carbon Co., Ltd., Nextel fibers made by 3M Co., or Astroquartz fibers made by JPS Industries Fabrics Corp.
2. The oligimer is polymerized in an autoclave preferably at 350° F. and 100 psi pressure although polymerization may occur at temperatures of 120°-210° F.

In the manufacturing process, the face layer 12 can be easily formed into complex shapes and then placed in an autoclave at the proper curing temperature and pressure for 1-3 hours. The cured piece can be machined or further formed by conventional methods in this state.

3. The rigid polymer is then pyrolyzed at temperatures below 1830° F. and preferably about 1500° F. in an inert nitrogen atmosphere. The pyrolysis converts the polymer precursor to silicon carboxide.

4. The pyrolyzation yield is approximately 80%-85% mass. To densify the structure, components which have been pyrolyzed are then reinfiltrated or reimpregnated with the Blackglas polymer solution and repyrolyzed. Using the reimpregnation/repyrolysis procedure, ceramic matrix Blackglas composites have been formed which have greater than 90% theoretical density. The final face layer 12 is formed after the subsequent reimpregnations and repyrolyzations.

The insulation layer 14 is of a material which is capable of providing adequate insulation to protect the activator mechanism from the extreme heat of the thrust of a turbine engine. The insulation layer 14 is a ceramic matric made from a polymer reinforced with a fiber such as NEXTEL. NEXTEL is an alumina-boria-silica fiber manufactured and sold by 3M. The insulation layer 14 also can be a glass or carbon fiber reinforced polyamide or a bismalimide or a syntactic foam, or other material having the same or similar insulating characteristics as these materials. Alternatively, the insulation layer 14 can be the same material used for the face layer 12, silicon carboxide, only in an unpyrolyzed state. Tile silicon carboxide then acts as a self-healing structure as the face layer 12 disintegrates from the extreme heat of the engine thrust exposing the insulation layer 14 to the extreme heat. When exposed to the extreme heat the insulation layer 14 then is pyrolyzed, forming yet another high temperature face layer 12. This greatly increases the life of the panel 10 until the insulation layer is consumed by conversion to a face layer 12.

Figure 2:
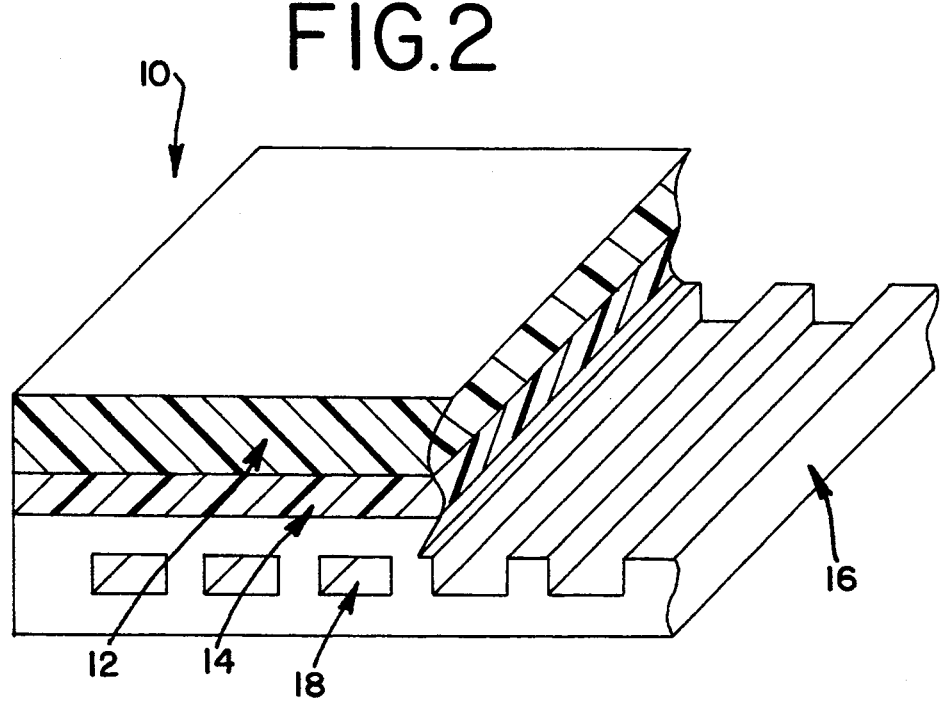
FIG. 2 is a sectional view of a thrust vector panel exemplary of a second embodiment of the invention.

Also, as illustrated in FIG. 2, the backbone or skeletal structure 16 can be formed with cooling paths 18 and/or with diagnostic devices such as fiber optics, sensors and the like.

The backbone or skeletal structure 16 consists of a fiber reinforced high temperature polymer, and supports all the integral interfaces, such as, mounting lugs, activation mounts and the like. When the panel 10 is configured for use as a removable insert panel, the backbone structure also can support or have a locking feature integrally or otherwise formed with it. The skeletal structure 16 can be a glass or carbon fiber polyamide or bismalimide, or other material having the same or similar characteristics. Examples are PMR 15 available from BASF or Fiberite and F655 available from Hexcel.

There are several methods of joining or bonding the face layer 12 to the insulation layer 4 and the insulation layer 14 to the skeletal structure 16. One method is after the face layer 12 is completely formed and pyrolyzed, it is bonded to the insulation layer 14 by a ceramic based adhesive such as Cerabond. Other commercially available ceramic based adhesives could also be used. This can also be used to bond the insulation layer to the skeletal structure 16.

The insulation layer 14 can also be of a material that when cured will parasitically bond to both the face layer 12 and skeletal structure 16. For example, polyamide or bismalimide cured at 550°-600° F. will bond to the Blackglas face layer 12 and if compatible, also bond to the skeletal structure 16. The Blackglas layer would have to be thick enough to keep the temperature at the interface between the face layer 12 and insulation layer 16 to less then about 450°. Other mechanical locking mechanisms could also be used to join the three layers.

In fabricating the thrust vectoring panel 10, there are several key factors to be considered on the integration of the three functional zones of the layers of the material. The anisotropic properties of the materials from which the three layers are formed are manipulated such that the properties of the materials, i.e., the coefficient of thermal expansion, the strain energy release rate, and the tensile and flexure modules, in particular, either match or gradually transition from material to material so as to result in a strong, unified panel 10.

What is claimed is:

1. A thrust vectoring panel for deflecting the thrust of axial turbine engines comprising
   a face layer comprising a silicon carboxide matrix with ceramic reinforcing fibers, an insulation layer and a skeletal structure,
   said face layer being of a material capable of withstanding high temperatures in the range of 2200°-2500° F. for an extended period of time and 2800° F. for a short period of time while retaining at least 90% of its room temperature strength during these temperature excursions, said insulation layer being of a fiber reinforced material capable of providing insulation from the extreme heat of the jet engine thrust, and said skeletal structure being of a fiber reinforced material capable of supporting integral interfaces.

2. The thrust vectoring panel of claim 1, wherein said face layer material can withstand temperatures of 2300°-2500° F. for at least 2000 hours and can withstand temperatures of 2800° F. for at least 5 minutes while retaining at least 90% of its room temperature strength during these temperature excursions.

3. The thrust vectoring panel of claim 1 wherein said insulation layer comprises a fiber reinforced ceramic matrix.

4. The thrust vectoring panel of claim 1 wherein the insulation layer is adhesively bonded to the face layer and the skeletal structure.

5. The thrust vectoring panel of claim wherein the insulation layer is parasitically bonded to the face layer and the skeletal structure.

6. The thrust vectoring panel of claim 1 wherein the skeletal structure further comprises channels embedded within the skeletal structure for receiving a cooling medium or diagnostic devices.

7. A thrust vectoring panel for deflecting the thrust in aircraft engines comprising:
   a face layer comprising a silicon carboxide matrix with ceramic reinforcing fibers, an insulation layer and a skeletal structure,
   the face layer being of a silicon carboxide matrix with ceramic reinforcing fibers, the face layer formed and cured from a polymer precursor which is polymerized and then pyrolyzed,
   the insulation layer being of the same material as the silicon carboxide matrix face layer in its polymerized state before pyrolyzation, the insulation layer providing insulation from the extreme heat of the aircraft engine, and
   the skeletal structure being of a fiber reinforced material capable of supporting integral interfaces.

8. The thrust vectoring panel of claim 7 wherein said face layer is capable of withstanding high temperatures in the range of 2200°–2500° F. for at least 2000 hours and 2800° F. for at least 5 minutes while retaining at least 90% of its room temperature strength during these temperature excursions.

9. The thrust vectoring panel of claim 8 wherein the insulation layer pyrolyzes when a portion of the face layer covering its wears away or disintegrates thereby exposing the underlying insulation layer, the insulation layer being exposed to the heat of the aircraft engine thrust and pyrolyzing.

10. The thrust vectoring panel of claim 8 wherein said insulation layer comprises a fiber reinforced ceramic matrix.

11. The thrust vectoring panel of claim 8 wherein the insulation layer is adhesively bonded to the face layer and the skeletal structure.

12. The thrust vectoring panel of claim 8 wherein the insulation layer is parasitically bonded to the face layer and the skeletal structure.

13. The thrust vectoring panel of claim 8 wherein the skeletal structure further comprises channels embedded within the skeletal structure for receiving a cooling medium or diagnostic devices.

* * * * *

UNITED STATES PATENT AND TRADEMARK OFFICE
CERTIFICATE OF CORRECTION

PATENT NO. : 5,352,529
DATED : October 4, 1994
INVENTOR(S) : John F. Scanlon, Gary Wigell It is certified that error appears in the above-identified patent and that said Letters Patent is hereby corrected as shown below:

Title Page,
On line 10 in the Abstract, the numbers "$2300°-25000°$" should read --$2200°-2500°$--.

On line 12 in the Abstract, the number "$28000°$" should read --$2800°$--.

On Column 1, line 36, a --/-- (slash) should appear after the word "ceramic".

On Column 1, line 45, the number "$2300°$" should read --$2200°$--.

On Column 3, line 22, the word "matric" should read --matrix--.

On Column 3, line 30, the word "Tile" should read --The--.

On Column 3, line 55, the number "4" should read --14--.

In Claim 2, Column 4, line 34, the number "$2300°$" should read --$2200°$--.
In Claim 5, Column 4, line 44, the number --1-- should appear between the words "claim" and "wherein".

Signed and Sealed this

Eighteenth Day of June, 1996

Attest:

BRUCE LEHMAN

*Attesting Officer*         *Commissioner of Patents and Trademarks*